US008666204B2

(12) United States Patent
Wu et al.

(10) Patent No.: US 8,666,204 B2
(45) Date of Patent: Mar. 4, 2014

(54) OPTICAL TRANSMISSION MODULE

(75) Inventors: Mao-Jen Wu, Taoyuan (TW);
Hsiao-Chin Lan, Taoyuan (TW);
Yun-Chih Lee, Taoyuan (TW);
Chia-Chi Chang, Taoyuan (TW);
Hsu-Liang Hsiao, Taoyuan (TW);
Chin-Ta Chen, Taoyuan (TW);
Bo-Kuan Shen, Taoyuan (TW);
Guan-Fu Lu, Taoyuan (TW);
Yan-Chong Chang, Taoyuan (TW);
Jen-Yu Chang, Taoyuan (TW)

(73) Assignee: National Central University, Taoyuan (TW)

( * ) Notice: Subject to any disclaimer, the term of this patent is extended or adjusted under 35 U.S.C. 154(b) by 303 days.

(21) Appl. No.: 13/114,323

(22) Filed: May 24, 2011

(65) Prior Publication Data
US 2011/0286694 A1  Nov. 24, 2011

(30) Foreign Application Priority Data
May 24, 2010 (TW) .............................. 99116551 A

(51) Int. Cl.
*G02B 6/12* (2006.01)
(52) U.S. Cl.
USPC .................. 385/14; 385/15; 385/31; 385/39; 385/42; 385/49
(58) Field of Classification Search
USPC .............. 385/14, 15, 31, 39, 42, 49
See application file for complete search history.

(56) References Cited

U.S. PATENT DOCUMENTS

| 6,554,491 | B2 * | 4/2003 | Sotokawa et al. ............ 385/88 |
| 7,085,079 | B2 | 8/2006 | Okazaki |
| 7,306,378 | B2 | 12/2007 | Alduino et al. |
| 2003/0034501 | A1 | 2/2003 | Higgins, Jr. |
| 2003/0205710 | A1 | 11/2003 | Gardner et al. |

(Continued)

FOREIGN PATENT DOCUMENTS

CN     101548492     9/2009
EP     2112537       10/2009
(Continued)

OTHER PUBLICATIONS

Extended European search report dated Dec. 6, 2011 of the counterpart European patent application Publication No. EP 2402800 A1.
(Continued)

*Primary Examiner* — Jennifer Doan
(74) *Attorney, Agent, or Firm* — WPAT, PC; Justin King

(57) ABSTRACT

An optical transmission module includes a semiconductor substrate, a first film layer, an electronic component layer and a waveguide structure. The electronic component layer is used for converting a first electrical signal into an optical signal. The waveguide structure is formed on the first film layer, and includes a first reflective surface, a waveguide body and a second reflective surface. After the optical signal is transmitted through the semiconductor substrate and the first film layer and enters the waveguide structure, the optical signal is reflected by the first reflective surface, transmitted within the waveguide body and reflected by the second reflective surface. After the optical signal reflected by the second reflective surface is transmitted through the first film layer and the semiconductor substrate and received by the electronic component layer, the optical signal is converted into a second electrical signal by the electronic component layer.

20 Claims, 5 Drawing Sheets

(56) References Cited

U.S. PATENT DOCUMENTS

| | | | |
|---|---|---|---|
| 2006/0067607 | A1 | 3/2006 | Fang et al. |
| 2009/0290836 | A1 | 11/2009 | Lee et al. |
| 2010/0067915 | A1 | 3/2010 | Fukasaku et al. |

FOREIGN PATENT DOCUMENTS

| | | |
|---|---|---|
| JP | 4-286375 | 10/1992 |
| JP | 2002131565 | 5/2002 |
| JP | 2002296434 | 10/2002 |
| JP | 2006091241 | 4/2006 |
| JP | 2007164110 | 6/2007 |
| JP | 2007212915 | 8/2007 |
| JP | 2008091976 | 4/2008 |
| TW | I280671 | 5/2007 |
| TW | 200737532 | 10/2007 |
| WO | 2008117703 | 10/2008 |

OTHER PUBLICATIONS

China office action dated Feb. 28, 2012 of the counterpart Chinese Patent Publication No. CN 101872043 A.

Jing Xue, Alok Garg, Berkehan Ciftcioglu, Jianyun Hu, Shang Wang, Ioannis Savidis, Manish Jain†, Rebecca Berman†, Peng Liu, Michael Huang, Hui Wu, Eby Friedman, Gary Wicks†, Duncan Moore†, An intra-chip free-space optical interconnect, ACM SIGARCH Computer Architecture News—ICSA '10, vol. 38, Issue 3, pp. 94-105, Jun. 2010.

Ian O'Connor, Faress Tissafi-Drissi, Frédéric Gaffiot, Joni Dambre, Michiel De Wilde, Joris Van Campenhout, Dries Van Thourhout, Jan Van Campenhout, and Dirk Stroobandt, Systematic Simulation-Based Predictive Synthesis of Integrated Optical Interconnect, IEEE Transactions on VLSI Systems, vol. 15, No. 8, pp. 927-940, Aug. 2004.

Behnam Analui, Drew Guckenberger, Daniel Kucharski, and Adithyaram Narasimha, A Fully Integrated 20-Gb/s Optoelectronic Transceiver Implemented in a Standard 0.13-mm CMOS SOI Technology, IEEE Journal of Solid-State Circuits, vol. 41, No. 12, pp. 2945-2955, Dec. 2006.

Charles W. Holzwarth, Jason S. Orcutt, Hanging Li, Miloš, A. Popović, Vladimir Stojanović, Judy L. Hoyt, Rajeev J. Ram, and Henry I. Smith, Localized Substrate Removal Technique Enabling Strong-Confinement Microphotonics in Bulk Si CMOS Processes, CLEO/QELS 2008, paper CThKK5.

P. De Dobbelaere (1), B. Analui, E. Balmater, D. Guckenberger, M. Harrison, R. Koumans, D. Kucharski, Y. Liang, G. Masini, A. Mekis, S. Mirsaidi, A. Narasimha, M. Peterson, T. Pinguet, D. Rines, V. Sadagopan, S. Sahni, T.J. Sleboda, Y. Wang, B. Welch, J. Witzens, J. Yao, S. Abdalla, S. Gloeckner, G. Capellini (2), Demonstration of First WDM CMOS Photonics Transceiver with Monolithically Integrated Photo-Detectors, ECOC 2008, Sep. 21-25, 2008, Brussels, Belgium.

Sung Hwan Hwang, Dae Dong Seo, Jae Yong An, Myeong-Hyun Kim, Woo Chang Choi, Sung Ryul Cho, Sang Hwan Lee, Hyo-Hoon Park, and Han Seo Cho, Parallel Optical Transmitter Module Using Angled Fibers and a V-Grooved Silicon Optical Bench for VCSEL Array, IEEE Transactions on Advance Packaging, vol. 29, No. 3, pp. 457-462, Aug. 2006.

Yurii Vlasov, Silicon photonics for next generation computing systems, http://www.research.ibm.com/photonics/publications/ecoc_tutorial_2008.pdf (Sep. 22, 2008).

* cited by examiner

OPTICAL TRANSMISSION MODULE

FIELD OF THE INVENTION

The present invention relates to an optical transmission module, and more particularly to an optical transmission module for converting and transmitting electrical signals or optical signals by using a waveguide structure to allow the optical signals to undergo total internal reflection.

BACKGROUND OF THE INVENTION

Conventionally, metallic transmission lines are widely used to transmit electrical signals or data between different components. In a high performance electronic system, since more and more processors are utilized and the signal processing speed is enhanced, it is important to enhance the quality and speed of transmitting the signals and data. However, the conventional metallic transmission lines fail to meet these requirements.

As known, there is almost no adverse influence of the material of the transmission line on the optical connection. Consequently, the optical signals may be transmitted at a high bandwidth and a high speed. Recently, the optical transmission gradually replaces the electrical transmission. For example, light emitting diodes (LEDs) and semiconductor lasers are developed by using light as a transmission medium. For example, an optical coupler is used to convert electrical signals into optical signals, convert optical signals into electrical signals, and emit and receive the electrical signals or optical signals. The optical coupler includes for example a light emitter or a light source unit for emitting optical signals, a light receiver or a light-detecting unit for receiving optical signals, or a driver circuit or an amplifier for driving or amplifying these signals.

Recently, in views of miniaturization and modularization, a system on chip (SoC) or a system-level integration (SLI) chip is developed. The system on chip technology integrates the functions of many components into a single integrated circuit (IC), so that the overall volume of the product is reduced but the applications are diversified. For example, a central processing unit includes a multi-core processor may be implemented by a SLI chip, wherein the cores have respective function and are in communication with each other and integrated into a single chip. For transmitting optical signals within the chip, the transmission paths should be elaborated designed. In particular, when optical signals are transmitted between respective chips or integrated circuits of the same circuit board, the transmission paths should be specially designed.

According to the current photoelectrical coupling, converting or transmitting techniques, an electronic component layer and a photonic layer may be either arranged at the same side of an optical transmission module or respectively arranged at different sides of the optical transmission module. The electronic component layer is a layer for operating the electrical signals or converting the electrical signals to optical signals. The transmitter and the receiver that emit and receive electrical signals or optical signals are also disposed in the photonic layer. For example, the electronic component layer is produced by a CMOS fabricating process. The photonic layer is a layer for transmitting optical signals. For example, the photonic layer is designed as a waveguide structure. In a case that the electronic component layer and the photonic layer are arranged at the same side, the units for generating or coupling electrical signals and optical signals are arranged at the same plane and connected with each other in series. Since the paths of transmitting the signals are in the same plane or the same layer, the optical signals may be emitted and received without deflection. In addition, since the fabricating processes of the electronic component layer and the photonic layer are usually different or incompatible, it is complicated to arrange the electronic component layer and the photonic layer at the same side. For example, by adding a specific material to the electronic component layer, the electronic component layer and the photonic layer may be arranged at the same side in the same fabricating process to achieve the purpose of emitting and receiving the optical signals. However, the use of the specific material is not cost-effective and the fabricating process needs to be elaborately adjusted.

In a case that the electronic component layer and the photonic layer are arranged at different sides, the transmission paths of the signals may be deflected between different layers or planes to achieve the purpose of emitting and receiving the optical signals. FIG. 1 schematically illustrates a conventional optical transmission module, in which the electronic component layer and the photonic layer are arranged at the different sides. In the optical transmission module 10, a driver circuit 16 is disposed on an integrated circuit layer 11, and upwardly connected with a light source unit 13 through a metallic line 121. The metallic line 121 is disposed within a metallic connecting structure 12. In particular, a vertical channel is formed in the metallic interconnection structure 12, and the metallic line 121 is disposed in the vertical channel to connect the light source unit 13 and the driver circuit 16. After an electrical signal is transmitted to the light source unit 13 through the metallic line 121, the light source unit 13 emits an optical signal. The optical signal is transmitted to a light-detecting unit 15 through an optical waveguide structure 14. By the light-detecting unit 15, the optical signal is converted into an electrical signal. The electrical signal is transmitted downwardly to an amplifier circuit 17 or other circuit, which is disposed in the integrated circuit layer 11, through another metallic line 122. Similarly, the metallic line 122 is disposed in another vertical channel to connect the light-detecting unit 15 and the amplifier circuit 17.

The electronic component layer and the photonic layer are separately produced by different fabricating processes and then combined together to provide the optical transmission module 10. However, it is difficult to install the metallic lines 121 and 122 in the metallic interconnection structure 12. It is also difficult to accommodate the metallic lines 121 and 122 to the fabricating processes of these two component layers. In addition, only electrical signals are allowed to pass through the metallic lines 121 and 122.

FIG. 2 schematically illustrates another conventional optical transmission module, in which the electronic component layer and the photonic layer are arranged at the different sides. In the optical transmission module 20, an integrated circuit layer 21 is upwardly connected with a light source unit 23 through metallic lines 221. For brevity, only three metallic lines 221 are shown in the drawing. The metallic lines 221 are disposed within a silicon substrate 22 and the integrated circuit layer 21. In particular, a vertical channel is formed in the silicon substrate 22 and the integrated circuit layer 21. The metallic line 221 is disposed in the vertical channels to connect the integrated circuit layer 21 and the light source unit 23. The light source unit 23 is disposed on the silicon substrate 22. After the electrical signal is transmitted to the light source unit 23 through the metallic line 221, an optical signal emitted from the light source unit 23 passes a gallium arsenide substrate 26 and is condensed by a micro lens array 27 before entering a free-space structure 24. The optical signal is then reflected by a plurality of micro mirrors 28 to be further propagated in the free-space structure 24. After the optical signal is received by a light-detecting unit 25, which is disposed on the silicon substrate 22, the optical signal is converted into an electrical signal. The electrical signal is transmitted downwardly to the integrated circuit layer 21 through another metallic line 222. Similarly, the metallic line 222 is disposed in another vertical channel to connect the light-detecting unit 25 and the integrated circuit layer 21.

Similarly, the electronic component layer and the photonic layer are separately produced by different fabricating processes and then combined together to produce the optical transmission module 20. However, it is difficult to install the metallic lines 221 and 222 in the silicon substrate. Although the light source unit 23 and the light-detecting unit 25 are flip-chip bonded to the silicon substrate 22, the free-space structure 24 should be large enough to allow the micro mirrors 28 to reflect and transmit the optical signals. In other words, the volume of the optical transmission module 20 is bulky.

SUMMARY OF THE INVENTION

Therefore, the object of the present invention is to provide an optical transmission module for converting and transmitting electrical signals or optical signals by using a waveguide structure to allow the optical signals to undergo total internal reflection. Consequently, the electronic component layer and the photonic layer arranged at different sides of the optical transmission module can be connected with each other in a simplified fabricating process. Since the optical transmission module is mainly used to emit, convert and receive optical signals, the problems of installing the vertical channel and the metallic lines will be overcome. In addition, the signal transmission efficiency of the optical transmission module is enhanced.

The present invention provides an optical transmission module for converting and transmitting a first electrical signal. The optical transmission module includes a semiconductor substrate, a first film layer, an electronic component layer and a waveguide structure. The first film layer is formed on a first surface of the semiconductor substrate. The electronic component layer is formed on a second surface of the semiconductor substrate for converting the first electrical signal into an optical signal. The waveguide structure is formed on the first film layer, and includes a first reflective surface, a waveguide body and a second reflective surface. After the optical signal is transmitted through the semiconductor substrate and the first film layer and enters the waveguide structure, the optical signal is sequentially reflected by the first reflective surface, transmitted within the waveguide body and reflected by the second reflective surface. After the optical signal reflected by the second reflective surface is transmitted through the first film layer and the semiconductor substrate and received by the electronic component layer, the optical signal is converted into a second electrical signal by the electronic component layer.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
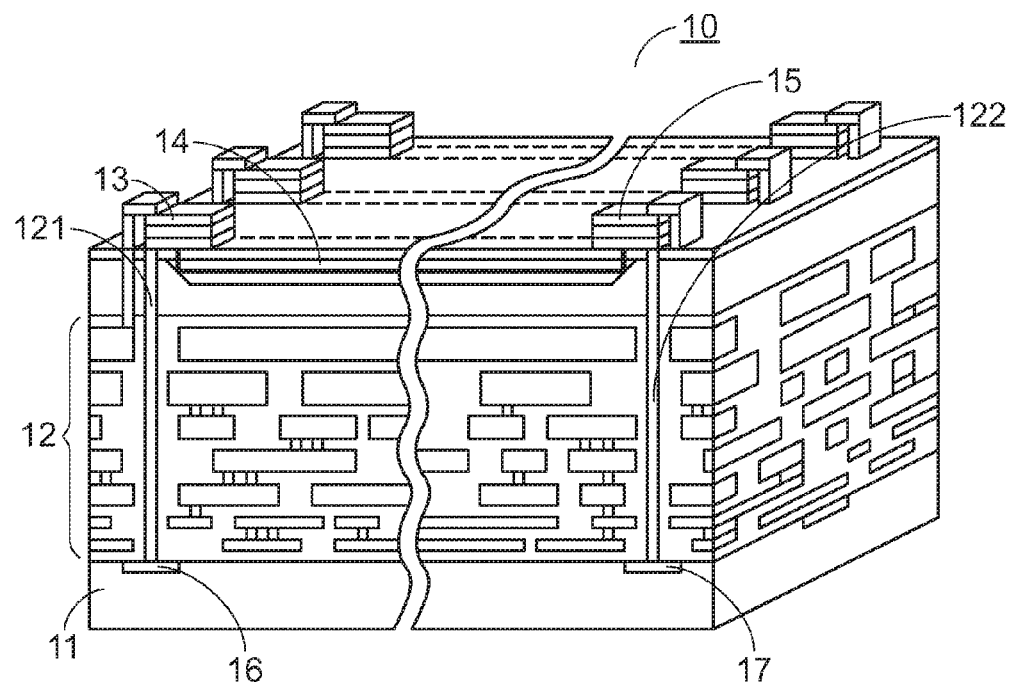
FIG. 1 schematically illustrates a conventional optical transmission module, in which the electronic component layer and the photonic layer are arranged at the different sides.
Figure 2:
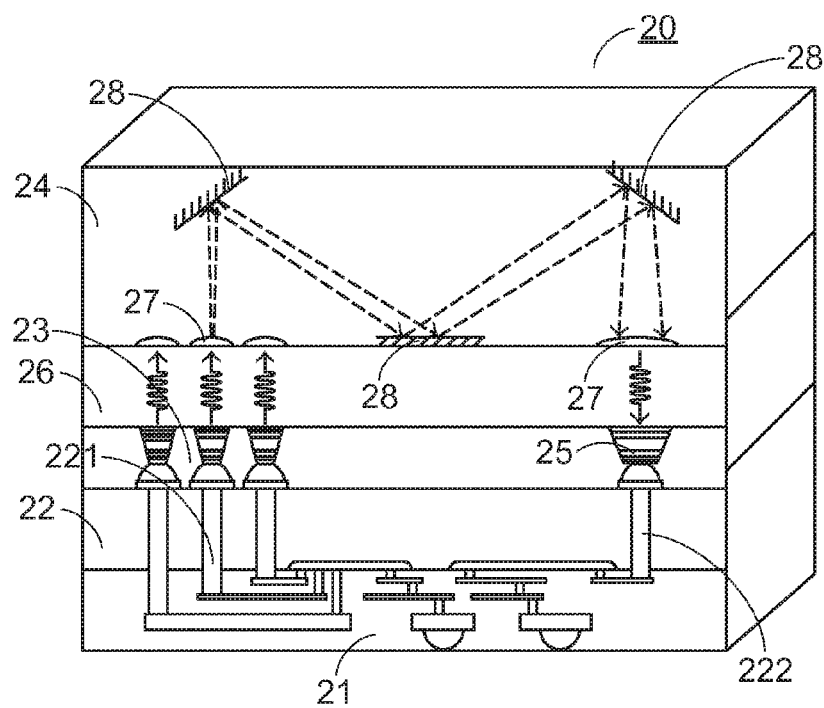
FIG. 2 schematically illustrates another conventional optical transmission module, in which the electronic component layer and the photonic layer are arranged at the different sides.
Figure 3A:
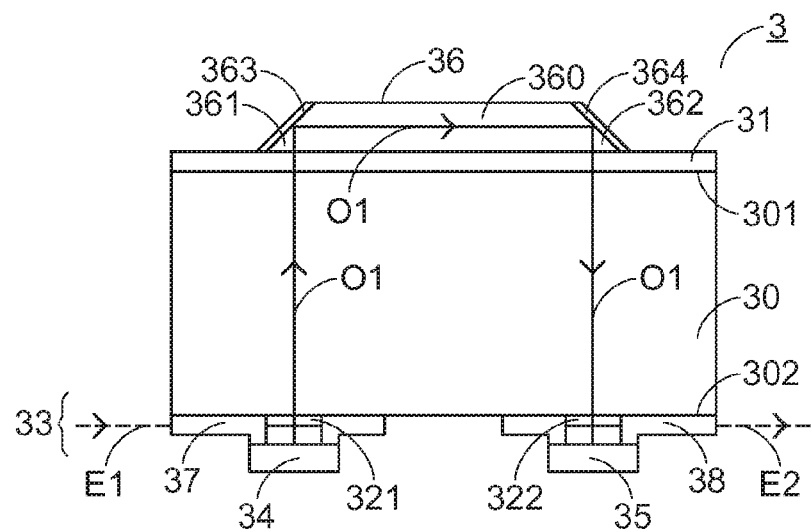
FIG. 3A is a schematic cross-sectional view illustrating an optical transmission module according to a first embodiment of the present invention.

FIG. 3A is a schematic cross-sectional view illustrating an optical transmission module according to a first embodiment of the present invention. As shown in FIG. 3A, the optical transmission module 3 includes a semiconductor substrate 30, a first film layer 31, an electronic component layer 33 and a waveguide structure 36. The semiconductor substrate 30 has two opposite surfaces: a first surface 301 (i.e. a top surface) and a second surface 302 (e.g. a bottom surface). The first film layer 31 and the electronic component layer 33 are formed on the first surface 301 and the second surface 302 of the semiconductor substrate 30, respectively. In this embodiment, the semiconductor substrate 30 is a monocrystalline silicon substrate in a form of double-sided polished silicon-on-insulator (SOI) wafer. As a consequence, associated units may be formed on the top and bottom surfaces of the semiconductor substrate 30 by a semiconductor producing process or a wafer bonding process. Due to the material properties of the silicon substrate, the optical signal can penetrate through the silicon substrate.

In this embodiment, the optical transmission module 3 is used for converting and transmitting a first electrical signal E1. Depending on the application or the environment of the optical transmission module 3, the first electrical signal E1 is provided by a designated or dedicated component. The electronic component layer 33 may receive the first electrical signal E1, and convert the first electrical signal E1 into an optical signal O1. In this embodiment, the electronic component layer 33 is an integrated circuit (IC) layer subjected to a CMOS process or a lithography process. A light source unit 34 and a driver circuit 37 are included in the electronic component layer 33. The driver circuit 37 is electrically connected with the light source unit 34. When the first electrical signal E1 is received by the driver circuit 37, the light source unit 34 is driven to correspondingly convert the first electrical signal E1 into the optical signal O1 and emit the optical signal O1. In this embodiment, the driver circuit 37 is disposed on the second surface 302 of the semiconductor substrate 30. In addition, the light source unit 34 is disposed on the driver circuit 37.

An example of the light source unit 34 includes but is not limited to a light emitting diode, a semiconductor laser or a vertical cavity surface emitting laser (VCSEL). The light source unit 34 is used for converting the received electronic signal into a light beam or an optical signal, and emitting the light beam or the optical signal. In addition, due to the material properties of the silicon substrate, the optical signal O1 may be a near-infrared ray that is transmissible through the silicon material. For example, the wavelength of the optical signal O1 is longer than 1.1 μm, and thus the optical signal O1 is penetrative and transmissible through the silicon material.

For increasing the penetrative property, the coupling efficiency and the anti-reflective property for the optical signal, the electronic component layer 33 further includes a second film layer 321, which is formed on the second surface 302 of the semiconductor substrate 30. The second film layer 321 is for example a single dielectric film layer made of silicon dioxide or nitrogen oxide. The second film layer 321 is light-penetrable and can be used to improve light coupling, so that the optical signal O1 is effectively transmissible through the second film layer 321. In this embodiment, the second film layer 321 is directly formed on the second surface 302 of the semiconductor substrate 30 by a semiconductor fabricating process. In addition, the second film layer 321 is aligned with the light source unit 34 and arranged beside the driver circuit 37. In this embodiment, the second film layer 321 is embedded within a through hole of the driver circuit 37 and formed on the second surface 302 of the semiconductor substrate 30. Alternatively, the second film layer 321 may be formed on the second surface 302 of the semiconductor substrate 30 along with the electronic component layer 33 by a wafer bonding process. In a case that the electronic component layer 33 is a SOI integrated circuit, the second film layer 321 may have a multi-layered film structure.

Moreover, the first film layer 31 is for example a single dielectric film layer. The use of the first film layer 31 may increase the penetrative property and the coupling efficiency for the optical signal. The refractive index of the first film layer 31 is different from that of the waveguide structure 36, which is disposed over the first film layer 31. In particular, the refractive index of the first film layer 31 is smaller than the refractive index of the waveguide structure 36. As a consequence, the optical signal coming from the first film layer 31 to the waveguide structure 36 may be confined within the waveguide structure 36 during the transmission of the optical signal within the waveguide structure 36. In this embodiment, as shown in FIG. 3A, the waveguide structure 36 includes a first reflective surface 363, a waveguide body 360 and a second reflective surface 364. As a consequence, the optical signal O1 may be transmitted within the waveguide body 360 by total internal reflection.

In this embodiment, the waveguide structure 36 is also made of a silicon material. Consequently, the waveguide structure 36, the semiconductor substrate 30 and the first film layer 31 may be integrally formed by the same semiconductor fabricating process. That is, after the first film layer 31 is formed on the first surface 301 of the semiconductor substrate 30, another silicon layer is formed on the first film layer 31 and then etched to obtain the waveguide structure 36 with a desired profile at a desired position. In an embodiment, the first reflective surface 363 and the second reflective surface 364 are etched to be 45-degree slant surfaces with respect to the first film layer 31. The other portion constitutes the wavelength body 360. After a reflective material is coated on the 45-degree slant surfaces, the first reflective surface 363 and the second reflective surface 364 are produced.

Moreover, the electronic component layer 33 further includes a light-detecting unit 35, a transimpedance amplifier 38 and a third film layer 322. Similarly, the transimpedance amplifier 38 is formed on the second surface 302 of the semiconductor substrate 30. The light-detecting unit 35 is disposed on the transimpedance amplifier 38 and electrically connected with the transimpedance amplifier 38. The characteristics and configurations of the third film layer 322 may be identical to the second film layer 321. That is, the third film layer 322 may have a single-layered or multi-layered film structure for increasing the penetrative property and the coupling efficiency of the optical signal. The third film layer 322 is formed on the second surface 302 of the semiconductor substrate 30 by a semiconductor fabricating process. In addition, the third film layer 322 is arranged beside the transimpedance amplifier 38 and aligned with the light-detecting unit 35. An example of the light-detecting unit 35 includes but is not limited to an optical receiver diode or a photodetector (PD) for receiving the optical signal O1 from the waveguide structure 36 and converting the optical signal O1 into a second electrical signal E2. The second electrical signal E2 is then amplified by the transimpedance amplifier 38 to be outputted.

Please refer to FIG. 3A again. The first reflective surface 363 and the second reflective surface 364 are respectively arranged at a first end 361 and a second end 362 of the waveguide structure 36. In addition, the locations of the first reflective surface 363 and the second reflective surface 364 correspond to the light source unit 34 and the light-detecting unit 35, respectively. The first film layer 31, the second film layer 321 and the third film layer 322 are highly-penetrative dielectric film layers. As a consequence, when the optical signal O1 is produced and emitted by the light source unit 34 at a right angle or a nearly right angle, the optical signal O1 is transmissible through the first film layer 31, the second film layer 321 and the third film layer 322. Moreover, the first film layer 31, the second film layer 321 and the third film layer 322 may have a single-layered or multi-layered film structure. For increasing the light penetration, an anti-reflection coating may be contained in the first film layer 31, the second film layer 321 or the third film layer 322.

The operation of the optical transmission module 3 may be illustrated as follows. Firstly, the first electrical signal E1 is converted into the optical signal O1. Then, the optical signal O1 is successively transmitted through the second film layer 321, the semiconductor substrate 30 and the first film layer 31, and enters the first end 361 of the waveguide structure 36. Then, the optical signal O1 is reflected by the 45-degree first reflective surface 363, so that the optical signal O1 is deflected perpendicularly. Then, the optical signal O1 is transmitted within the waveguide body 360. When the optical signal O1 is directed to the second end 362 of the waveguide structure 36 and reflected by the 45-degree second reflective surface 364, the optical signal 01 is deflected again. As a consequence, the optical signal O1 is successively transmitted through the first film layer 31, the semiconductor substrate 30 and the third film layer 322 to be received by the light-detecting unit 35. The optical signal O1 is converted into the second electrical signal E2 by the light-detecting unit 35. In such way, the optical path is created between the electronic component layer 33 and the photonic layer (i.e. the waveguide structure 36), and thus the optical signal is transmitted between different planes. Consequently, the optical transmission module 3 may allow the optical signal to be deflected in the three-dimensional space in a non-coplanar manner. In this embodiment, the contents represented by the second electrical signal E2, the first electrical signal E1 and the optical signal O1 are identical.

Figure 3B:
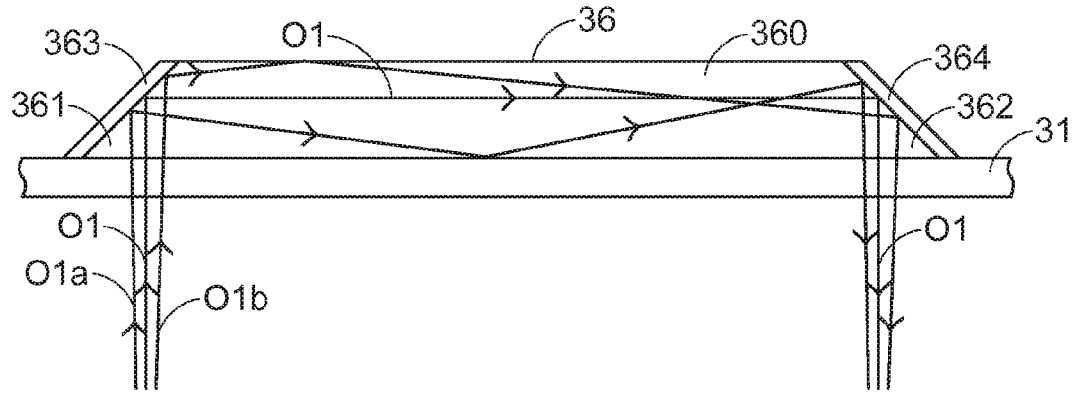
FIG. 3B schematically illustrates the optical path of the optical signal in the optical transmission module of FIG. 3A.

FIG. 3B schematically illustrates the optical path of the optical signal O1. Ideally, the optical signal O1 is transmitted within the waveguide body 360 along an optical path parallel with the longitudinal direction of the waveguide body 360. In practice, the optical signal O1 emitted by the light source unit 34 is not ideally at a right angle with respect to the longitudinal direction of the waveguide body 360, but slightly diverged at a small angle. For example, as shown in FIG. 3B, since the optical paths O1a and O1b do not perpendicularly enter the first end 361 of the waveguide structure 36, the angle between the incidence ray and the reflection ray of the first reflective surface 363 is not 90 degrees. Since the angle of incidence with respect to the inner surface of the waveguide body 360 is larger enough to be equal to or greater than a critical angle of the total internal reflection with respect to the underlying first film layer 31 or the overlying air, the optical signal may be transmitted within the waveguide body 360 by total internal reflection. Afterwards, the optical signal is reflected by the second reflective surface 364 and received by the light-detecting unit 35. For creating the total internal reflection, the refractive index of the first film layer 31 should be smaller than the refractive index of the silicon material of the waveguide structure 36.

Figure 3C:
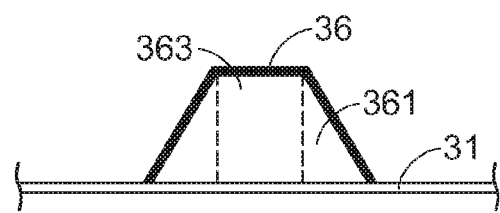
FIG. 3C is a schematic cross-sectional view illustrating the first end of the waveguide structure of the optical transmission module of FIG. 3A.

FIG. 3C is a schematic cross-sectional view illustrating the first end of the waveguide structure of the optical transmission module. The configuration of the second end 362 is similar to that of the first end 361 of the waveguide structure 36, and is not redundantly described herein. As shown in FIG. 3C, the sidewalls at the bilateral sides of the waveguide structure 36 are slant surfaces, so that the waveguide structure 36 has a trapezoid profile.

In this embodiment, the optical signal is directed and concentrated on the two reflective surfaces 363 and 364, and reflected by the upper surface and the lower surface of the waveguide body 360 to undergo the total internal reflection. As long as the areas of the 45-degree reflective surfaces 363 and 364 are properly adjusted and the sidewalls at the bilateral sides thereof are provided to allow the total internal reflection of the optical signal within the waveguide structure 36, the overall profile of the waveguide structure 36 is not restricted.

The optical transmission module 3 of the present invention may be mounted on a printed circuit board (not shown). The printed circuit board is electrically connected with the electronic component layer 33 of the optical transmission module 3 for providing the first electrical signal E1, which is received and converted by the optical transmission module 3. In addition, the second electrical signal E2 from the optical transmission module 3 may be transmitted to the printed circuit board to be further processed. In other words, the optical transmission module 3 is a communication medium between respective units, chips or integrated circuits that are mounted on the printed circuit board. By means of the optical transmission module 3, the purpose of transmitting optical signals is achieved.

Moreover, the optical transmission module 3 of the present invention may be implemented by a single chip (not shown). For example, the optical transmission module 3 may be implemented by a system on chip (SoC) technology. Alternatively, the optical transmission module 3 may be adopted in a multi-core design for a central processing unit. Consequently, respective cores are in communication with each other through the optical transmission module 3, and the optical signals are transmitted in an intra-chip manner.

Figure 4:
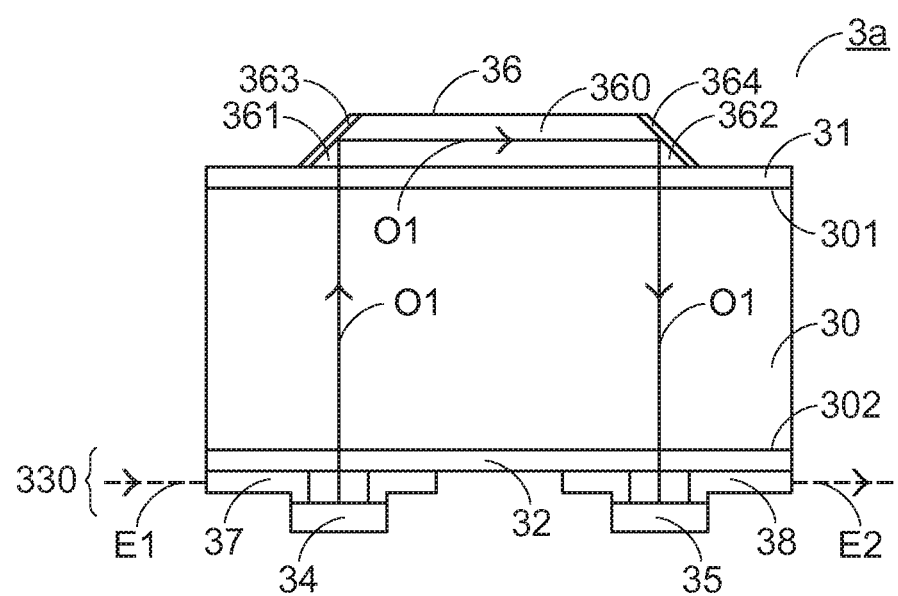
FIG. 4 is a schematic cross-sectional view illustrating an optical transmission module according to a second embodiment of the present invention.

For preventing electromagnetic or electrical interference during transmission and conversion of the electrical and optical signals, the optical transmission module of the first embodiment may be further modified. FIG. 4 is a schematic cross-sectional view illustrating an optical transmission module according to a second embodiment of the present invention. The semiconductor substrate 30, the first film layer 31, the electronic component layer 33 and the waveguide structure 36 included in the optical transmission module 3a of FIG. 4 are similar to those of the first embodiment. However, the second film layer 32 is spread over the second surface 302 of the semiconductor substrate 30. That is, the second film layer 32 of the electronic component layer 33 is formed on the second surface 302 of the semiconductor substrate 30. In addition, the driver circuit 37 and the transimpedance amplifier 38 are disposed on the second film layer 32. The light source unit 34 and the light-detecting unit 35 are disposed on the driver circuit 37 and the transimpedance amplifier 38, respectively.

The characteristics and configurations of the second film layer 32 may be identical to those of the second film layer and the third film layer of the first embodiment. That is, the second film layer 32 may have a single-layered or multi-layered film structure for increasing the penetrative property and the coupling efficiency of the optical signal. In addition to the functions of increasing the penetrative property, the coupling efficiency and the anti-reflective property of the optical signal, the second film layer 32 may facilitate isolating the other units of the electronic component layer 330 from the light path within the semiconductor substrate 30. In other words, the second film layer 32 may provide effective electrical isolation and prevent signal loss. In this embodiment, the second film layer 32 may be directly formed on the second surface 302 of the semiconductor substrate 30 by a semiconductor fabricating process. Alternatively, the second film layer 32 may be formed on the second surface 302 of the semiconductor substrate 30 along with the electronic component layer 33 by a wafer bonding process.

As previously described, the conventional optical transmission module has vertical channels. Whereas, since no vertical channels are formed in the optical transmission module of the present invention, the complicated process of forming the vertical channels is avoided. Moreover, in the optical transmission module of the present invention, the optical signal is directly transmitted through the silicon substrate. As a consequence, the overall transmitting speed of the optical transmission module is enhanced. In addition, since the adverse influences (e.g. signal attenuation, signal leakage or environmental interference) of using the metallic lines are avoided, the efficacy of transmitting the optical signals is enhanced. Moreover, the electronic component layer and the photonic layer are separately produced by different fabricating processes and then bonded together to produce the optical transmission module of the present invention. In comparison with the conventional optical transmission module, the optical transmission module of the present invention is easily produced without the need of elaborately adjusting the electronic component layer. Moreover, the overall volume of the optical transmission module of the present invention is reduced.

In the above embodiments, the optical transmission module may generate an optical signal and use a waveguide structure to transmit the optical signal by total internal reflection. In some embodiments, the optical transmission module may generate a plurality of optical signals and use the same number of waveguide structures to transmit the optical signals. Moreover, the optical transmission module of the present invention may receive and transmit a plurality of electrical signals. The plurality of electrical signals are converted into respective optical signals by corresponding light sources units. The optical signals are reflected and transmitted by respective waveguide structures, and received and converted by respective light-detecting units.

In the above embodiments, the electronic component layer of the optical transmission module is an integrated circuit (IC) layer subjected to a CMOS process or a lithography process. In addition, corresponding electrical signals are processed by the driver circuit and the transimpedance amplifier; and the optical signal is processed by the light source unit and the light-detecting unit. In addition to the CMOS fabricating process, the integrated circuit layer may be produced by any other process. In a case that the optical transmission module is implemented by a system on chip (SoC) technology and the optical signals are transmitted in an intra-chip manner, the computing function may be integrated into the integrated circuit layer. For example, the driver circuit or the transimpedance amplifier may be integrated into the integrated circuit layer. As a consequence, the electrical path structure and the optical path structure with different line widths or fabricating processes may be formed on the same silicon substrate to produce a monolithic opto-electrical module. In such situation, the electronic component layer will have both the driving function and the computing function to provide enhanced optical transmission efficiency.

Figure 5A:
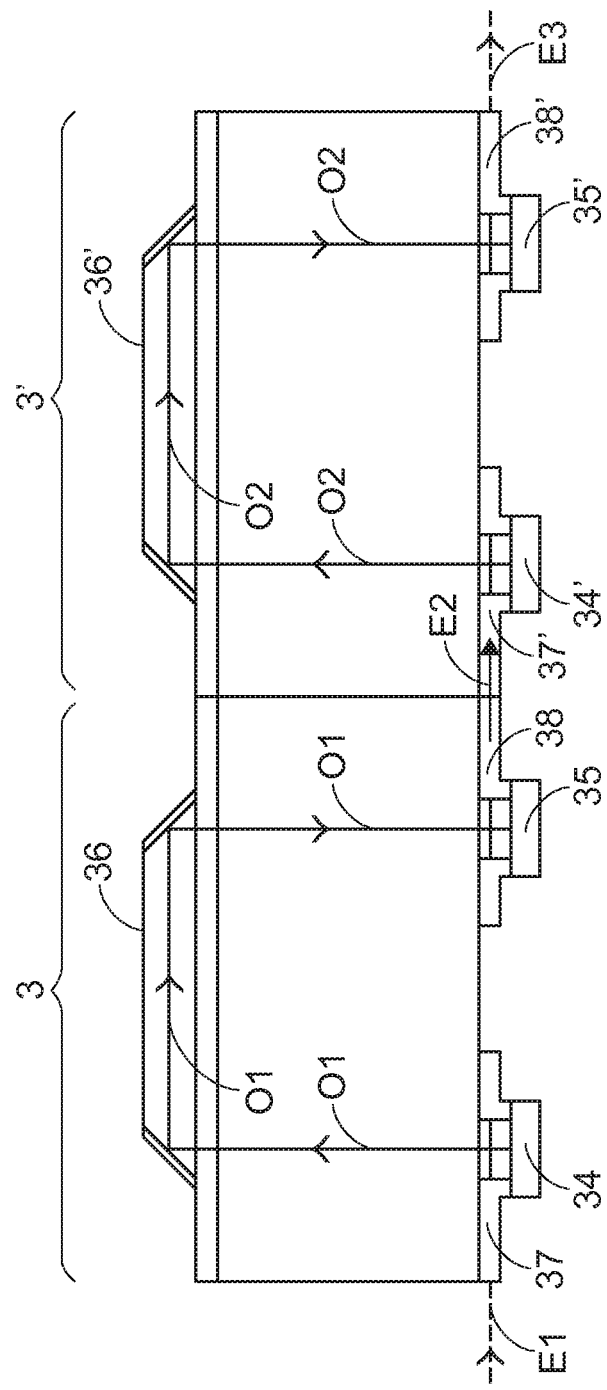
FIG. 5A is a schematic cross-sectional view illustrating a combination of two optical transmission modules according to an embodiment of the present invention.

For transmitting the optical signal through desired positions of the chip or the printed circuit board, the optical transmission module of the present invention may be modified. FIG. 5A is a schematic cross-sectional view illustrating a combination of two optical transmission modules according to an embodiment of the present invention. As shown in FIG. 5A, two optical transmission modules 3 and 3' are arranged side by side, so that the waveguide structures 36 and 36' are parallel with each other. The transimpedance amplifier 38 of the optical transmission module 3 is electrically connected with the driver circuit 37' of the optical transmission module 3'. Similarly, after a first electrical signal E1 is converted into an optical signal O1 by the light source unit 34, the optical signal O1 is transmitted through the waveguide structure 36 and then received by the light-detecting unit 35 to be converted into a second electrical signal E2. The second electrical signal E2 is directly transmitted to the optical transmission module 3'. Then, the second electrical signal E2 is converted into an optical signal 02 by the light source unit 34'. The optical signal 02 is transmitted through the waveguide structure 36' and then received by the light-detecting unit 35' to be converted into a third electrical signal E3. Then, the third electrical signal E3 is amplified by the transimpedance amplifier 38 to be outputted. In such way, the contents represented by the optical signals O1, O2 and the electrical signals E1, E2, E3 are identical. Consequently, the signals may be substantially transmitted to the desired positions through multiple opto-electrical conversions.

Figure 5B:
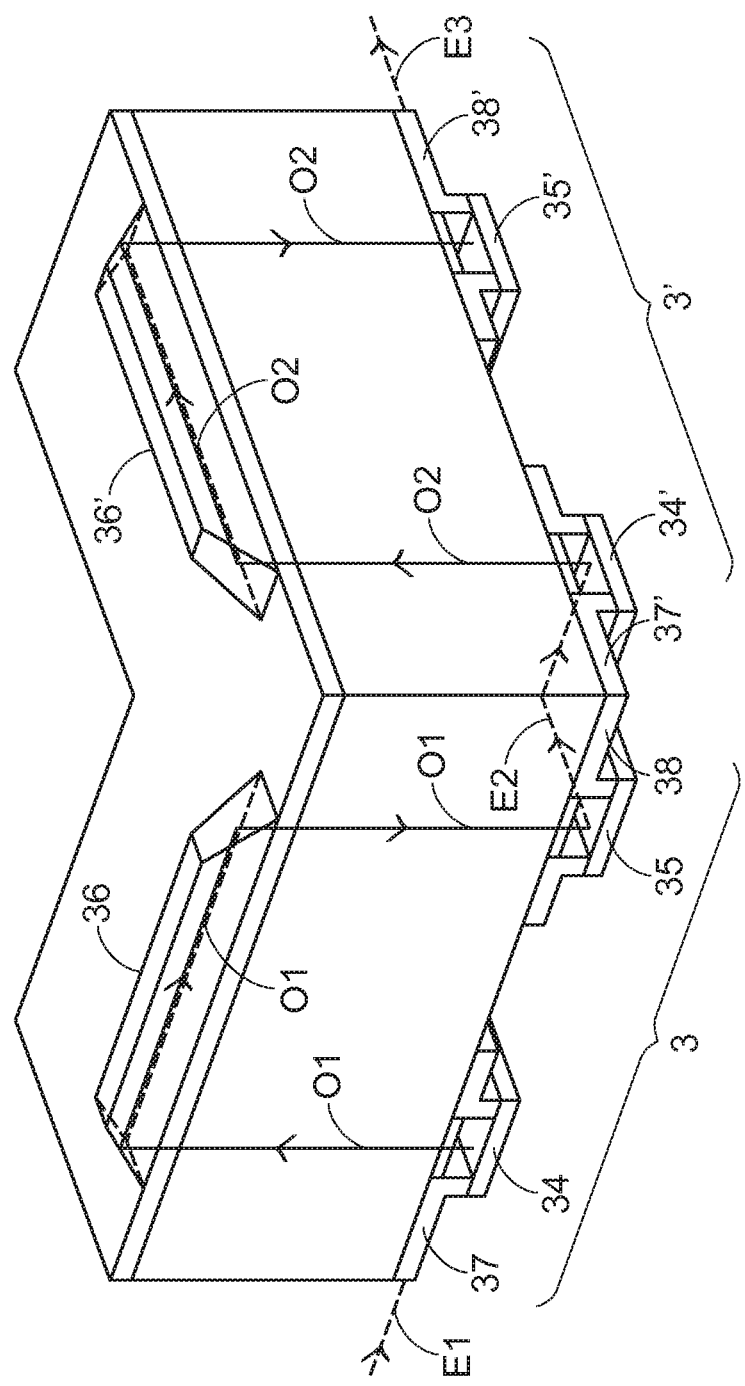
FIG. 5B is a schematic cross-sectional view illustrating a combination of two optical transmission modules according to another embodiment of the present invention.

FIG. 5B is a schematic cross-sectional view illustrating a combination of two optical transmission modules according to another embodiment of the present invention. As shown in FIG. 5B, two optical transmission modules 3 and 3' are perpendicular to each other, so that the waveguide structures 36 and 36' are perpendicular to each other. The transimpedance amplifier 38 of the identical optical transmission module 3 is electrically connected with the driver circuit 37' of the optical transmission module 3'. Since the transimpedance amplifier 38 is perpendicular to the driver circuit 37', the transimpedance amplifier 38 and the driver circuit 37' are connected with each other through a corresponding circuit or connecting line. The operating principles of the combination of the two optical transmission modules are similar to those of FIG. 5A, and are not redundantly described herein. Consequently, the signals may be substantially transmitted to the desired positions through multiple opto-electrical conversions.

From the above description, the optical transmission module of the present invention is capable of increasing the signal transmission speed while obviating the drawbacks encountered from the prior art. Moreover, a combination of a plurality of optical transmission modules may be used to transmit the signals to desired positions through multiple opto-electrical conversions. As a consequence, the application of the optical transmission module of the present invention is expanded.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical transmission module for converting and transmitting a first electrical signal, the optical transmission module comprising:
    a semiconductor substrate having a first surface and a second surface opposite to the first surface;
    a first film layer formed on the first surface of the semiconductor substrate;
    an electronic component layer formed on the second surface of the semiconductor substrate for converting the first electrical signal into an optical signal and emitting the optical signal; and
    a waveguide structure formed on the first film layer, and comprising a first reflective surface, a waveguide body and a second reflective surface,
    wherein after the optical signal is transmitted through the semiconductor substrate and the first film layer and enters the waveguide structure, the optical signal is sequentially reflected by the first reflective surface, transmitted within the waveguide body and reflected by the second reflective surface, wherein after the optical signal reflected by the second reflective surface is transmitted through the first film layer and the semiconductor substrate and received by the electronic component layer, the optical signal is converted into a second electrical signal by the electronic component layer.

2. The optical transmission module according to claim 1 wherein the semiconductor substrate is monocrystalline silicon substrate and the first film layer has a single-layered or multi-layered film structure for providing anti-reflective and penetrative properties.

3. The optical transmission module according to claim 1 wherein the electronic component layer includes a light source unit for converting the first electrical signal into the optical signal and emitting the optical signal, the light source unit including a light emitting diode (LED), a semiconductor laser or a vertical cavity surface emitting laser (VCSEL).

4. The optical transmission module according to claim 3 wherein the first reflective surface is arranged at a first end of the waveguide structure, and the location of the first reflective surface corresponds to the light source unit to allow the optical signal to be reflected by the first reflective surface.

5. The optical transmission module according to claim 3 wherein the electronic component layer comprises:

a second film layer formed on the second surface of the semiconductor substrate for providing anti-reflective efficacy; and a driver circuit formed on the second surface of the semiconductor substrate, and arranged beside the second film layer for transmitting the first electrical signal to drive the light source unit, wherein the light source unit is disposed on the driver circuit, aligned with the second film layer and electrically connected with the driver circuit.

6. The optical transmission module according to claim 5 wherein the second film layer has a single-layered or multi-layered film structure for providing anti-reflective and penetrative properties, and the driver circuit is integrated into an integrated circuit layer by a system on chip (SoC) technology so as to have driving and computing functions.

7. The optical transmission module according to claim 3 wherein the electronic component layer comprises:

a second film layer formed on the second surface of the semiconductor substrate for providing electrical isolation; and a driver circuit formed on the second film layer for transmitting the first electrical signal to drive the light source unit, wherein the light source unit is disposed on the driver circuit and electrically connected with the driver circuit.

8. The optical transmission module according to claim 7 wherein the second film layer has a single-layered or multi-layered film structure for providing anti-reflective and penetrative properties, and the driver circuit is integrated into an integrated circuit layer by a system on chip technology so as to have driving and computing functions.

9. The optical transmission module according to claim 1 wherein the electronic component layer further comprises a light-detecting unit for receiving the optical signal and converting the optical signal into the second electrical signal, the light-detecting unit including an optical receiver diode or a photodetector.

10. The optical transmission module according to claim 9 wherein the second reflective surface is arranged at a second end of the waveguide structure, and the location of the second reflective surface corresponds to the light-detecting unit to allow the optical signal reflected by the second reflective surface to reach the light-detecting unit.

11. The optical transmission module according to claim 9 wherein the electronic component layer comprises:

a third film layer formed on the second surface of the semiconductor substrate for providing anti-reflective efficacy; and a transimpedance amplifier formed on the second surface of the semiconductor substrate, and arranged beside the third film layer for amplifying the second electrical signal from the light-detecting unit and outputting the amplified second electrical signal, wherein the light-detecting unit is disposed on the transimpedance amplifier, aligned with the third film layer and electrically connected with the transimpedance amplifier.

12. The optical transmission module according to claim 11 wherein the third film layer has a single-layered or multi-layered film structure for providing anti-reflective and penetrative properties, and the transimpedance amplifier is integrated into an integrated circuit layer by a system on chip technology so as to have driving and computing functions.

13. The optical transmission module according to claim 9 wherein the electronic component layer comprises:

a second film layer formed on the second surface of the semiconductor substrate for providing electrical isolation; and a transimpedance amplifier formed on the second film layer for amplifying the second electrical signal from the light-detecting unit and outputting the amplified second electrical signal, wherein the light-detecting unit is disposed on the transimpedance amplifier and electrically connected with the transimpedance amplifier.

14. The optical transmission module according to claim 13 wherein the second film layer has a single-layered or multi-layered film structure for providing anti-reflective and penetrative properties, and the transimpedance amplifier is integrated into an integrated circuit layer by a system on chip technology so as to have driving and computing functions.

15. The optical transmission module according to claim 1 wherein the waveguide structure is made of a silicon material and there is a 45-degree angle between the first reflective surface and the first film layer and between the second reflective surface and the first film layer, wherein the refractive index of the first film layer is smaller than the refractive index of the waveguide structure, so that the optical signal is transmitted within the waveguide body by total internal reflection after the optical signal is reflected by the first reflective layer.

16. The optical transmission module according to claim 15 wherein the optical signal transmitted in the waveguide structure is a near-infrared ray.

17. The optical transmission module according to claim 1 wherein the waveguide structure and the semiconductor substrate are integrally formed, and the first reflective surface and the second reflective surface are produced by a semiconductor etching process.

18. The optical transmission module according to claim 1 wherein the electronic component layer is an integrated circuit layer subjected to a lithography process or a CMOS process, or the electronic component layer is formed on the second surface of the semiconductor substrate by a wafer bonding process.

19. The optical transmission module according to claim 1 wherein the optical transmission module is mounted on a printed circuit board, wherein the printed circuit board is electrically connected with the electronic component layer for transmitting the first electrical signal and the second electrical signal.

20. The optical transmission module according to claim 1 wherein the optical transmission module is implemented in a single chip.

* * * * *